(12) United States Patent
Hermida Domínguez et al.

(10) Patent No.: US 11,571,950 B2
(45) Date of Patent: Feb. 7, 2023

(54) HEATING DEVICE

(71) Applicant: BorgWarner Ludwigsburg GmbH, Ludwigsburg (DE)

(72) Inventors: Xoan Xosé Hermida Domínguez, Pontevedra (ES); José Antonio Sanromán Prado, Pontevedra (ES); Alejandro Vargas Curto, Vigo (ES); Matías Baleato Peón, Santiago de Compostela (ES); José Miguel Sánchez Lobato, Vigo (ES)

(73) Assignee: BorgWarner Ludwigsburg GmbH

( * ) Notice: Subject to any disclaimer, the term of this patent is extended or adjusted under 35 U.S.C. 154(b) by 669 days.

(21) Appl. No.: 16/546,974

(22) Filed: Aug. 21, 2019

(65) Prior Publication Data
US 2020/0062082 A1 Feb. 27, 2020

(30) Foreign Application Priority Data

Aug. 27, 2018 (EP) ..................................... 18382624

(51) Int. Cl.
*B60H 1/22* (2006.01)
*H05B 1/02* (2006.01)

(52) U.S. Cl.
CPC ......... *B60H 1/2215* (2013.01); *H05B 1/0236* (2013.01); *B60H 2001/2271* (2013.01)

(58) Field of Classification Search
CPC .......... B60H 1/2215; B60H 2001/2271; F24H 1/009; H05B 1/0236
USPC ........................... 219/202; 392/314, 455, 465
See application file for complete search history.

(56) References Cited

U.S. PATENT DOCUMENTS

| 10,895,403 B2* | 1/2021 | Hermida Domínguez ................. F24H 1/142 |
| 2008/0053981 A1* | 3/2008 | Adachi ..................... H05B 3/50 219/202 |
| 2011/0180617 A1* | 7/2011 | Saito ..................... F24H 3/0429 236/49.3 |

(Continued)

FOREIGN PATENT DOCUMENTS

| EP | 0104673 A2 | 4/1984 |
| EP | 2734007 A1 | 5/2014 |
| FR | 2938632 A1 | 5/2010 |

(Continued)

OTHER PUBLICATIONS

Extended European Search Report including the Written Opinion for Application No. EP 18382624.7 dated Mar. 19, 2019, 7 pages.

*Primary Examiner* — Dana Ross
*Assistant Examiner* — Joe E Mills, Jr.
(74) *Attorney, Agent, or Firm* — Lerner, David, Littenberg, Krumholz & Mentlik, LLP

(57) ABSTRACT

The present invention relates to a heating device for use in vehicles, particularly to a device for heating a fluid, for example air, water, or liquid coolant. The device is particularly designed for vehicles the main propulsion system of which is not a combustion engine and which therefore lack residual heat from the engine. The present invention is characterized by the use of a chassis with a planar configuration and an inner chamber in fluid communication with an inlet port and an outlet port and a heating plate. The chassis comprises at least one window and the heating plate has a heating region closing the window of the chassis for heating the fluid housed in the inner chamber.

14 Claims, 7 Drawing Sheets

(56) References Cited

U.S. PATENT DOCUMENTS

2011/0188839 A1* 8/2011 Trebouet ................ F24H 1/009
                                                                     392/478
2012/0087642 A1* 4/2012 Bohlender ............... H05B 3/24
                                                                     392/465

FOREIGN PATENT DOCUMENTS

WO    2010025955 A1    3/2010
WO    2013175433 A1    11/2013

* cited by examiner

HEATING DEVICE

CROSS-REFERENCE TO RELATED APPLICATION

The present application claims priority from European Patent Application No. 18382624.7 filed Aug. 27, 2018, the disclosure of which is hereby incorporated herein by reference.

OBJECT OF THE INVENTION

The present invention relates to a heating device for use in vehicles, particularly to a device for heating a fluid, for example air, water, or liquid coolant. The device is particularly designed for vehicles the main propulsion system of which is not a combustion engine and which therefore lack residual heat generated by the engine.

The present invention is characterized by the use of a chassis with a planar configuration and an inner chamber in fluid communication with an inlet port and an outlet port and a heating plate. The chassis comprises at least one window and the heating plate has a heating region closing the window of the chassis for heating the fluid housed in the inner chamber.

BACKGROUND OF THE INVENTION

One of the fields of the art undergoing the most intensive development today is the field of heating systems in vehicles, for example in commercial vehicles or private passenger cars. Vehicles with internal combustion engines usually generate enough residual heat to be utilized in heating a fluid, for example air, in order to heat the cabin. However, hybrid or electric vehicles do not have enough residual heat to be utilized and alternative solutions must be used.

Electrical fluid heating systems are used in hybrid and electric vehicles for controlling the temperature of the cabin, for defrosting, or for conditioning batteries, which are highly sensitive to extreme temperatures. These systems are powered by batteries of the vehicle and generally comprise one or more electrical resistors generating heat by the Joule effect. The heat thereby generated is transmitted to a fluid with which it is in thermal contact, for example water, liquid coolant, or air.

In some air conditioning or heating systems known in the field of the art, electrical resistors are in direct contact with the fluid which is often electrically conductive.

In these examples, the resistors are inserted into the chamber through which the fluid to be heated circulates, and a large number of sealing gaskets that withstand the high temperatures of the resistors and the action of the fluid must be used. These gaskets must also assure leak-tightness when they are subjected to straining due to thermal expansion, since the resistors reach high temperatures with respect to the body holding it and can undergo significant expansions.

According to other examples of the state of the art, the resistors are housed in cavities giving rise to protuberances inside the chambers through which the fluid to be heated circulates. In these cases, the resistors are separated from the fluid to be heated establishing a barrier to the passage of heat, and there are large pressure drops in the flows of the heated fluid as it is forced to go through the protuberances.

As identified in all these cases, the systems must be leak-tight and prevent fluid leakages which damage the heating system or other elements of the vehicle. Among the most common solutions is the use of sealing gaskets which assure that the heat-generating elements and the fluid circuit are duly isolated in order to prevent both fluid losses and the risk of short-circuits.

To assure the functionality thereof, the sealing gaskets must be elastically deformable and adaptable to the shape of the gasket of the area to be isolated. In the particular case of heating systems, the gaskets must also withstand the high temperatures reached during the operation of the device. Even if the sealing gaskets fulfill the preceding conditions, leakages may occur as a result of material deterioration either due to heat, vibrations, or aging of the gasket material. Furthermore, the processes for manufacturing devices with a large number of sealing gaskets are demanding in terms of manpower, machinery, and material, resulting in a significant increase in the cost of the heating device. If the devices are intended for use in a vehicle, they must also be lightweight, resistant to vibrations and impacts, and protected from dirt, dust, and other environmental agents, in addition to withstanding the action of the fluid circulating through the inside thereof.

In general, a device having these features is difficult and expensive to manufacture, with the risk of fluid loss due to gasket failure not being eliminated, and with the obtained devices suffering significant pressure drops. However, the present invention allows overcoming the preceding problems in a simple and cost-effective manner by means of a device according to the claim.

DESCRIPTION OF THE INVENTION

The present invention proposes a solution to the preceding problems by means of a heating device which drastically reduces the use of sealing gaskets, thereby increasing safety and manufacturability, and has a configuration in which lower pressure drops have been proven to be obtained in the heated fluid flow.

In a first inventive aspect, the present invention provides a heating device for use in a vehicle and configured for heating a fluid circulating between an inlet port and an outlet port.

In other words, the fluid to be heated circulates through a conduit in which the device according to the first inventive aspect is interposed. The device comprises an inlet port through which the fluid to be heated enters and an outlet port through which the hot fluid exits when said device is in the operative mode.

The device according to the invention comprises:
- a chassis with a planar configuration, comprising a first face and a second face arranged on the side opposite the first face, defining an inner chamber for the passage of the fluid, wherein
   - the inner chamber comprises at least a first window arranged on one of the faces of the chassis;
   - the inlet port is in fluid communication with the inner chamber, and
   - the outlet port is in fluid communication with the inner chamber;
- a heating plate;
- at least one heating region in the heating plate;

characterized in that the heating plate is configured for closing the at least one window of the inner chamber in a leak-tight manner, wherein the heating region of the heating plate is oriented towards the inside of the inner chamber for heating fluid intended for circulating through the inner chamber.

"Chassis" is understood to be a frame which has a structural function and additionally has, in an essential manner, the final shape of the component, allowing various additional components until the complete device, which in this case is the heater, is configured.

The shape defined by the chassis comprises an inner chamber which is in fluid communication with the inlet port for feeding the fluid to be heated, and with the outlet port for the fluid to exit once it is heated when the device is in the operative mode.

The planar configuration of the device is advantageous for several reasons: on one hand, it allows a good ratio between the surface for the transmission of heat to the fluid to be heated and the volume of fluid circulating through the interior thereof, and the configuration of the device is very compact.

On the other hand, it allows the heating plate, or heating plates if they are several of them, to be easily manufactured even when they are configured with several stratified layers. The planar configuration of the chassis is adapted to this shape of the heating plate. The assembly thereby configured allows a compact arrangement of the assembly of the device.

The inner chamber is advantageously formed as a hollow volume inside the chassis. The chassis comprises at least one window making the volume of the inner chamber accessible from the outside such that the heating plate closes the window or windows of the inner chamber in a leak-tight manner.

The heating plate has at least one heating region and this region is oriented towards the inside of the inner chamber. Therefore, in the operative mode, when the fluid to be heated goes through the inside of the inner chamber and the heating plate is activated, the heating region heats the fluid which is in direct communication or contact with said region.

The heating region must be interpreted as a region of the area of the heating plate intended for transferring heat to the fluid which is in contact with said area. In other words, according to one embodiment the heating plate has resistors that do not have to be located in the heating region, but generate heat which is transferred to the fluid through the heating region.

According to another embodiment, the heating plate is a Peltier plate, such that it pumps heat from one of its surfaces to another surface, which is where the heating region is located when the Peltier plate is electrically energized.

According to a preferred example, the chassis, with the exception of the window, the inlet port, and the outlet port, is leak-tight. Likewise, the assembly of the device forms a route or path for the fluid to be heated which starts from the inlet port, goes through the inner chamber, and ends up in the outlet port.

In the operative mode, when the fluid to be heated circulates through the inside of the inner chamber of the heating device, it comes into thermal contact with the heating region of the heating plate or plates, such that heat transmission to the fluid occurs, increasing the temperature thereof.

The heating region of the heating plate must be oriented towards the inside of the inner chamber such that, in the operative mode, it is in thermal contact with the fluid circulating through the inner chamber. Water, liquid coolant, air, or thermal oil can be mentioned as examples of fluids to be heated.

Given that the chassis has a planar configuration, it is possible to define a main reference plane and two faces located opposite one another.

In a preferred embodiment, the device with a planar configuration comprises two windows, one on each of the main faces of the chassis. Each of the windows comprises the corresponding heating plate which allows closing the inner chamber in a leak-tight manner and heating the fluid. In this embodiment, the chassis forms primarily the side walls of the conduits which are part of the inner chamber as well as the seats on which the heating plates rest. These heating plates establish the leak-tight closure of the inner chamber and define the heating regions which now configure the surfaces of the inner chamber intended for transferring heat to the fluid operatively circulating through the interior thereof.

Therefore and according to this preferred example, it is possible to maximize the surface for heat exchange with the fluid, doubling the heating capacity with substantially the same device volume. It has been proven that this configuration also allows establishing particularly compact fluid circulation paths with a lower pressure drop than in devices known in the state of the art.

In a particular embodiment, the window or windows are divided into smaller openings by means of portions of the chassis.

According to other embodiments which improve heat exchange with the fluid by maintaining a compact configuration, the chassis is configured such that the fluid follows a path comprising one or more segments with a change in direction of the fluid, giving rise to a longer path, maintaining the compactness of the device. The configurations of interest include, among others, a U-shaped configuration with two straight segments and a curved, intermediate connecting segment, an S-shaped segment having two curved, intermediate connecting segments, or as will be described below, a configuration with three curved intermediate segments giving rise to a W-shaped configuration. The advantage of the U- and W-shaped configurations is that it is possible to place the inlet port and the outlet port on one and the same side of the device, allowing simpler and quicker assemblies.

DESCRIPTION OF THE DRAWINGS

These and other features and advantages of the invention will be shown more clearly based on the following detailed description of a preferred embodiment, given solely by way of illustrative and non-limiting example in reference to the attached drawings.

DETAILED DESCRIPTION OF THE INVENTION

According to the first inventive aspect, the present invention relates to a heating device (D) for use in a vehicle and configured for heating a fluid circulating between an inlet port (I) and an outlet port (O).

Positional references such as lower, upper, right, left, front, or rear will refer at all times to the orientation shown in the figure being described at that time.

Figure 1:
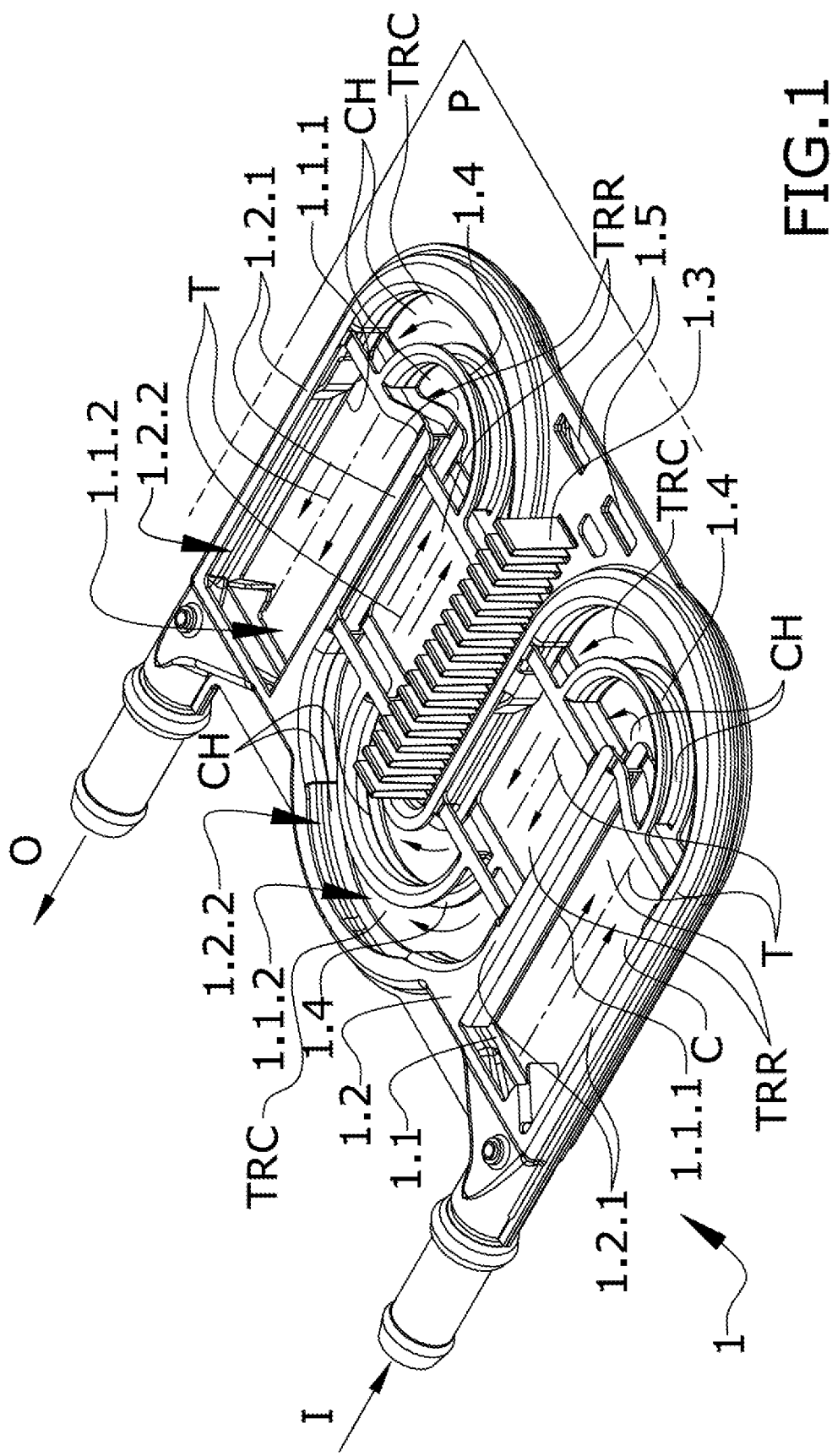
FIG. 1 shows a perspective view of a chassis of an embodiment in which said chassis is formed by two parts referred to as "half-chassis".

Considering FIG. 1 which shows an embodiment of the invention, the heating device (D) comprises a chassis (1) with a planar configuration extending according to a plane which is identified as the main plane (P).

Figure 2:
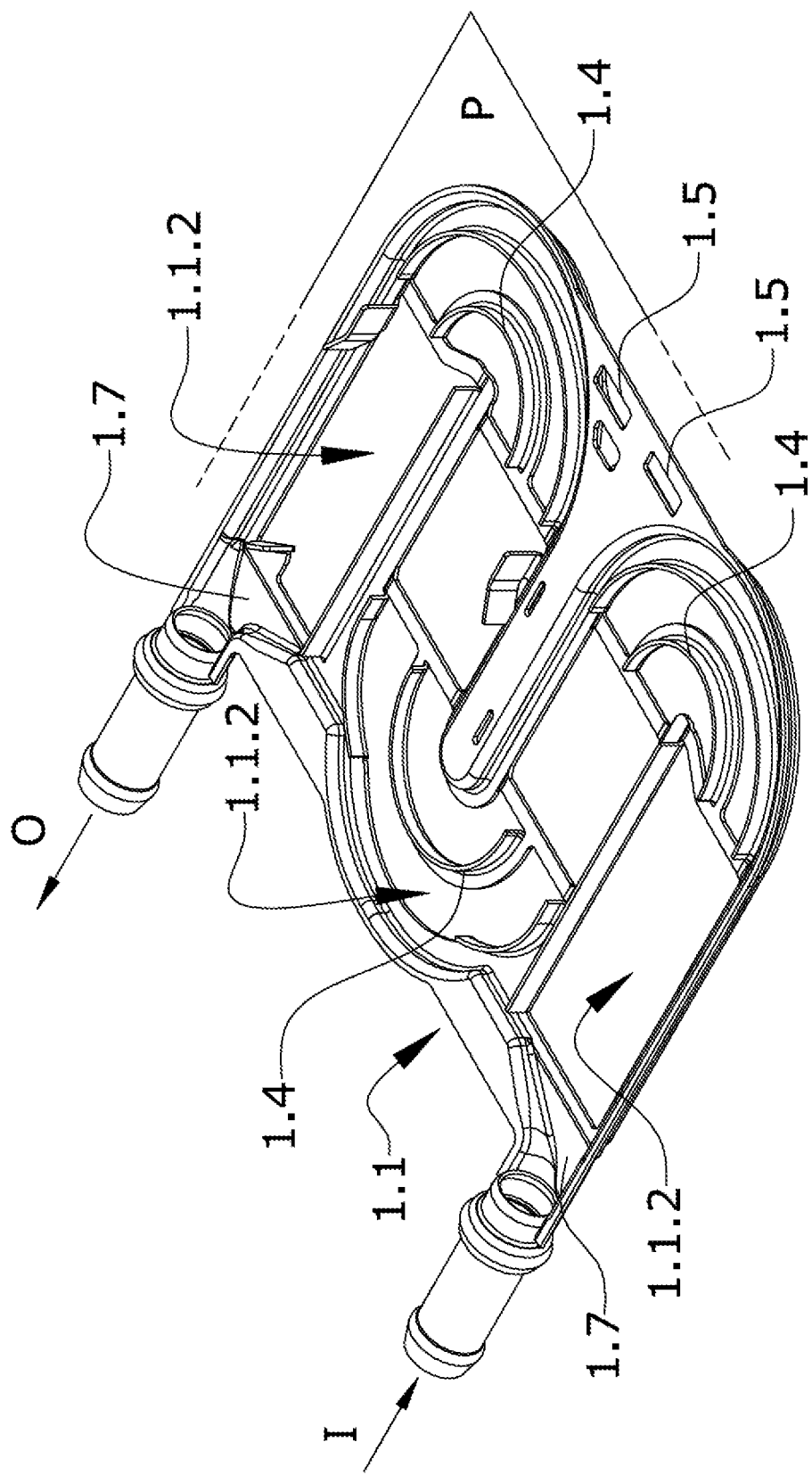
FIG. 2 shows a perspective view of the lower half-chassis of the same embodiment of FIG. 1 and the inlet port and outlet port formed by two spigots.

The chassis (1) comprises two half-chassis (1.1, 1.2) attached to one another in the main plane (P). FIG. 2 shows one of the two half-chassis (1.1), i.e., the lower half-chassis, as well as the inlet port (I) and the outlet port (O) configured by means of a spigot. This spigot allows, for example, connecting the heating device (D) with a conduit through which the fluid to be heated circulates, leaving the heating device (D) intercalated in said conduit.

The chassis (1) of the embodiment is a metallic chassis and the attachment between the two half-chassis (1.1, 1.2) is by means of brazing, or alternatively by means of laser welding. According to one embodiment, each half-chassis (1.1, 1.2) comprises a perimetral flange with a configuration complementary to the other perimetral flange, such that the two half-chassis (1.1, 1.2) are welded together through these perimetral flanges.

According to one embodiment, at least one half-chassis (1.1, 1.2) is made of steel. According to another embodiment, at least one half-chassis (1.1, 1.2) is made of injected aluminum or aluminum stamped and punched from a flat plate. According to another embodiment, at least one half-chassis (1.1, 1.2) is made of stainless steel. According to another embodiment, one half-chassis (1.1, 1.2) is made of one material and the other half-chassis (1.1, 1.2) of another different material.

According to one embodiment, the two half-chassis (1.1, 1.2) are identical such that it is only necessary to manufacture a mold and build the chassis (1) by attaching these two identical parts.

The attachment of the two half-chassis (1.1, 1.2) gives rise to an inner chamber (C) which can be seen in FIG. 1 given that it is not closed by means of the heating plates (2, 3).

Both the half-chassis (1.1) located in the bottom part of FIG. 1 and the half-chassis (1.2) located in the top part have windows (1.1.2, 1.2.2) the perimeter of which is limited by support seats (1.1.1, 1.2.1).

In this embodiment, the support seats (1.1.1, 1.2.1) of the lower half-chassis (1.1) and the upper half-chassis (1.2) are contained in respective planes parallel to the main plane (P), such that a first heating plate (2) rests on the seats (1.1.1) of the lower half-chassis (1.1) and a second heating plate (3) rests on the seats (1.2.1) of the upper half-chassis (1.2), with the two heating plates (2, 3) closing the corresponding windows (1.1.2, 1.2.2) and therefore configuring an also closed inner chamber (C) communicated with the inlet port (I) and the outlet port (O).

According to this configuration, the chassis (1) with a planar configuration shows two main faces, a first face (A) arranged on one side of the main plane (P) and a second face (B) arranged on the opposite side according to the same main plane (P). Each of the heating plates (2, 3) is located on one face (A) and another face (B) of the chassis (1), respectively.

The attachment of the heating plates (2, 3) with the chassis (1) through the seats (1.1.1, 1.2.1) in this embodiment is by means of laser welding since the face of the heating plate (2, 3) oriented towards its corresponding seat (1.1.1, 1.2.1) is a metallic face. Another alternative attachment mode is by means of adhesive or by means of brazing. This attachment assures the leak-tight closure of the inner chamber (C).

In this configuration, all the windows (1.1.2, 1.2.2) of one face (A, B) of the chassis (1), given that the corresponding seats (1.1.1, 1.2.1) thereof are coplanar, are closed by a single heating plate (2, 3). In an alternative embodiment, the chassis (1), the windows (1.1.2, 1.2.2), and the corresponding seats (1.1.1, 1.2.1) are not coplanar and comprise at least one step, such that the windows (1.1.2, 1.2.2) are closed by means of a plurality of heating plates (2, 3).

As shown in FIG. 1, the inner chamber (C) places the inlet port (I) in fluid communication with the outlet port (O) according to a path formed by straight segments (TRR) as well as curved segments (TRC), giving rise to a change in direction. The prismatic straight segments (TRR) show portions of the volume of the inner chamber (C) having an essentially rectangular section where the larger sides of the rectangular section are defined by the upper and lower heating plates (2, 3) and the smaller sides are defined by the walls demarcated by the chassis (1). These smaller sides according to embodiments are also curved to prevent corners and stagnation regions in the fluid flowing through the inner chamber (C).

According to this embodiment, to adapt the circular section of the inlet port (I) to the rectangular section of the inner chamber (C) and to again adapt the rectangular section of the inner chamber (C) to the circular section of the outlet port (O), respectively, the chassis (1) comprises conical nozzles (1.7) or manifolds.

According to this embodiment, the curved segments (TRC) are segments in the shape of a 180° arc of a circle and comprise at least one baffle (1.4), also a segment in the shape of an arc of a circle, located in the center such that it divides the volume of the curved segment (TRC) into two channels (CH). The baffles (1.4) of this embodiment are configured in two half-parts, each of the half-parts belonging to a half-chassis (1.1, 1.2). The attachment of the two half-chassis (1.1, 1.2) also gives rise to the attachment of the half-parts of the baffle (1.4).

The path is identified by means of a discontinuous line (T) the configuration of which is W-shaped; in other words, a first straight departing segment (TRR) starting from the inlet port (I), a first curve (TRC), a first straight return segment (TRR), a second curve (TRC), a second straight departing segment (TRR), a third curve (TRC), and finally a second straight return segment (TRR) which communicates with the outlet port (O). The direction of the fluid flow is indicated in FIG. 1 by means of arrows.

The advantage of this configuration is that the device (D) maintains a very compact configuration and at the same time the path of the fluid is long; furthermore the inlet port (I) and outlet port (O) are arranged parallel to one another and on one and the same side wall of the chassis (1). "Side wall" of the chassis (1) is understood to be one or more wall segments of the chassis (1) extending in the direction perpendicular to the main plane (P) connecting both faces (A, B) of the chassis (1).

Other configurations of interest are:
- a U-shaped configuration where there is only one curved segment (TRC) and two straight segments,
- an S-shaped configuration where there are two curved segments (TRC) and three straight segments, and the inlet port (I) and outlet port (O) are in opposite side walls.

Likewise, it is possible to increase the number of curved segments (TRC), for example by keeping all the straight segments (TRR) parallel to one another, giving rise to a very compact zigzag path.

If the channel through which the path (T) extends is very wide, the area of the path where the flow is more unstable corresponds to the curved segments (TRC). In the embodiment, a baffle (1.4) the segment of which is in the shape of an arc of a circle has been incorporated for accelerating and guiding the fluid; nevertheless, it is possible to include a larger number of baffles (1.4) the segments of which are in the shape of an arc, also giving rise to a larger number of channels (CH) parallel to one another.

Figure 4:
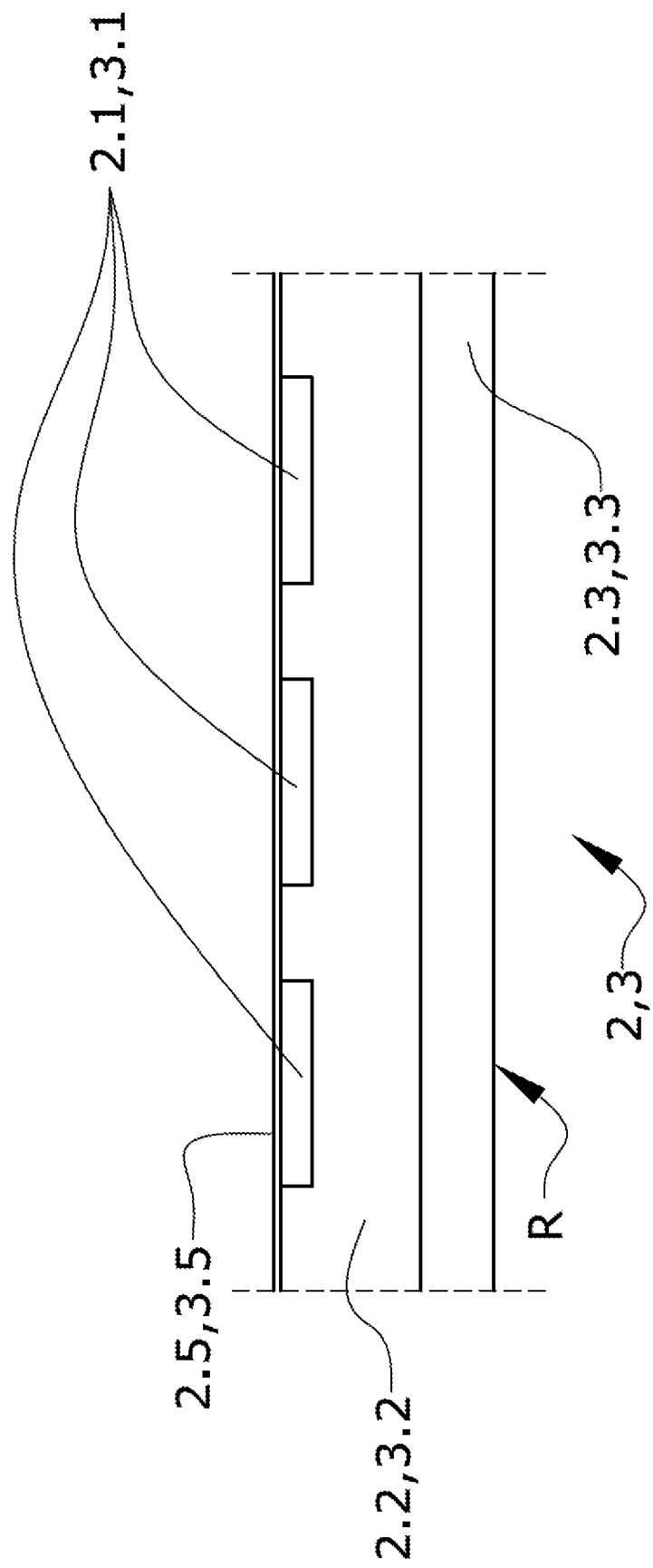
FIG. 4 schematically shows a section of a heating plate according to an embodiment. The figure shows the layer and component assembly according to the sectional configuration.

According to this embodiment and as shown in FIG. 4, each of the heating plates (2, 3) comprises a heating element (2.1, 3.1) made up of a plurality of metal tracks or strips, a layer of dielectric material (2.2, 3.2), and a structural plate (2.3, 3.3) that are stacked together. Therefore, the stacking according to this embodiment is as follows:
- the dielectric material is interposed between the structural plate (2.3, 3.3) and the heating element (2.1, 3.1), and
- the heating region (R) is located on the surface of the structural plate (2.3, 3.3) opposite the surface of the structural plate (2.3, 3.3) in contact with the layer of dielectric material (2.2, 3.2).

According to this embodiment, the structural plate (2.3, 3.3) is intended for being oriented towards the inner chamber (C) such that the layer is in direct contact with the fluid to be heated.

The metal tracks making up the heating element (2.1, 3.1) form a circuit of resistors which generate heat when powered by a power supply. Above the described stack and particularly on the metal tracks, in this embodiment the heating plate (2, 3) is covered by a protective sheet (2.5, 3.5) which prevents direct access to the metal tracks of the heating elements (2.1, 3.1), preventing short-circuits or preventing a person from being able to receive an accidental electric discharge, for example.

The structural plate (2.3, 3.3) according to this specific example is a metal plate which offers high thermal conductivity and facilitates the transfer of heat generated by the metal tracks acting as resistors with respect to the fluid with which it is in contact. In this embodiment, the heating region (R) is the portion of the area of the structural plate (2.3, 3.3) which coincides with the window (1.1.2, 1.2.2) and through which a heat flow to the fluid with which it is in direct contact is established when the heating device (D) is in the operative mode.

According to this embodiment, the chassis (1) has a plurality of windows (1.1.2, 1.2.2) on either side of the main plane (P) and all the windows (1.1.2) of one side are closed by means of the lower heating plate (2) and all the windows (1.2.2) of the other side are closed by means of the upper heating plate (3). This is possible because all the seats (1.1.1, 1.2.1) of each of the sides of the chassis (1) are coplanar.

The heating plates (2, 3) comprise sets of electrical connectors (2.4, 3.4) for powering the electric circuit formed by the heating elements (2.1, 3.1). According to this embodiment, these electrical connectors (2.4, 3.4) are strips made of a conductive material which are attached by means of welding to the ends of the tracks extending over the heating plate (2, 3). These electrical connectors (2.3, 3.4) power the heating elements (2.1, 3.1).

A heating plate may have one or more heating elements (2.1, 3.1). In the embodiment shown in FIG. 3, each of the heating plates (2, 3) comprises several heating elements (2.1, 3.1), each of which is configured as a metal track, each being parallel to one another, and each one having an independent power supply.

Each of the heating elements (2.1, 3.1) has at least two electrical connectors (2.4, 3.4), one at each end of the heating element (2.1, 3.1), which are in electric communication with an electronic board or PCB (5), PCB being the abbreviation of "printed circuit board", intended for powering each of the heating elements (2.1, 3.1) in a controlled manner. In one embodiment, the electrical connectors (2.4, 3.4) protrude transversely from the heating plate or plates (2, 3) until reaching the electronic board (5).

According to the described embodiment, the chassis (1) with a planar configuration comprises a heating plate (2, 3) on each of the faces (A, B) closing one or more windows (1.1.2, 1.2.2). The heating plates (2, 3) have the heating region (R) oriented towards the inner cavity (C) of the chassis (1) such that the heat generated in the heating elements (2.1, 3.1) of each of the heating plates (2, 3) is transferred to the fluid housed in the inner chamber (C) through the heating region (R). Nevertheless, the heating plates (2, 3) have a free face, the face opposite the face on which the heating region (R) is located. The temperature of this free face also increases, but it is not a surface for the transfer of heat to the fluid.

According to one embodiment, this free surface of the heating plate (2, 3) is covered by a protective element to prevent direct contact with the heating plate (2, 3), for example by means of a protective sheet. According to another embodiment, the free surface of the heating plate (2, 3) is covered by a thermal insulator, forcing the heat generated in the heating plate (2, 3) to be transferred to the fluid through the heating region and not to the outside through the free surface.

According to an alternative embodiment, given that the temperature of the heating plate increases on its two faces, the heating device (D) comprises at least:
- a heating plate (2),
- two chassis (1) with a planar configuration, referred to as first chassis (1) and second chassis (1), where each of the chassis (1) comprises a window (1.1.2) for accessing the chamber (C), and where a face of the heating plate (2) comprises a heating region (R) closing the window (1.1.2) for accessing the chamber (C) of the first chassis (1) and the opposite face of the heating plate (2) comprises a heating region (R) closing the window (1.1.2) for accessing the chamber (C) of the second chassis (1), such that a stack is configured where the heating plate (2) is interposed between the first chassis (1) and the second chassis (1).

According to another more complex embodiment, this stacked configuration is extended with a larger number of chassis (1) with a planar configuration and a plurality of heating plates (2), leaving a heating plate (2) interposed between two consecutive chassis (1) such that the face of each chassis (1) oriented towards a heating plate (2) has a window (1.1.2) for accessing the inner chamber (C) thereof, this inner chamber (C) being closed by the heating plate (2).

The plurality of chassis (1) according to this stacked configuration can arrange the flow paths (T) between the inlet port (I) and the outlet port (O) in parallel for heating a larger fluid flow, or in series for increasing the temperature to a greater extent according to a scale of temperature ranges.

In these embodiments, a specific configuration places the heating element or elements (2.1) of the heating plate (2) in a position such that the sectional structure of the heating plate is symmetrical.

The electronic board (5) is flat and located parallel to the main plane (P) above the chassis (1). The electrical connectors (3.4) of the heating elements (3.1) of the upper heating plate (3) protrude perpendicular to the main plane (P) until reaching the electronic board (5).

The electrical connectors (2.4) of the heating elements (2.1) of the lower heating plate (2) first extend parallel to the main plane (P) until going past the side of the chassis (1) and then protrude perpendicular to the main plane (P) also until reaching the electronic board (5).

Both the electrical connectors (2.4) starting from the lower heating plate (2) and the electrical connectors (3.4) starting from the upper heating plate (3) have segments perpendicular to the main plane (P). These segments may simply be transverse to the main plane (P). "Transverse to a surface" is understood to describe both a perpendicular direction with respect to a surface and an oblique direction with respect to a surface, and excludes the directions substantially parallel to said surface.

Both electrical connectors (2.4, 3.4) are attached to the tracks of the electronic board (5) by means of different contacts (5.2, 5.3) for receiving the electrical connectors (2.4) of the lower heating plate (2) and for receiving the electrical connectors (3.4) of the upper heating plate (3).

Each of the heating elements (2.1, 3.1) receives energy in a controlled manner, i.e., it is powered by means of one or more electronic components, preferably switching devices (5.4). These switching devices (5.4) allow selectively connecting and disconnecting the power supply, i.e., perform controlled switching of the current. Preferably, the switching devices (5.4) are IGBT (insulated-gate bipolar transistor)-type or MOSFET (metal-oxide-semiconductor field-effect transistor)-type transistors.

The switching device or devices (5.4) receive energy from a high-voltage line and transmit it in switched form to the heating elements (2.1, 3.1). The switching device or devices (5.4) are controlled through the injection of current to the gate of the device by means of a control circuit powered by a low-voltage line.

In one embodiment, the high-voltage circuit comprises a high-voltage power supply connector (7) and the low-voltage circuit comprises a low-voltage power supply connector (6).

The terms "high voltage" and "low voltage" must be understood as references to a first supply voltage of the device and to a second supply voltage of the device, respectively, the first voltage or high voltage being greater than the second voltage or low voltage.

In one embodiment, the switching devices are IGBT transistors (5.4).

The switching of the IGBT transistors (5.4) generates heat and increases their temperature. To dissipate heat, according to the embodiment, the chassis (1) comprises a group of cooling fins (1.3) protruding from the side oriented towards the electronic board (5) and reaching the lower face of said electronic board (5) in the position in which the IGBT transistors (5.4) are located. Although the temperature of the chassis (1) may increase due to the fact that it is a device intended for increasing the temperature of the fluid circulating therethrough by means of the heating elements (2.1, 3.1), the temperature is relatively cold with respect to the temperature which the IGBT switching transistors (5.4) can reach.

The group of cooling fins (1.3), in thermal contact with the base of the IGBT transistors (5.4), transfer the heat generated by the IGBT transistors (5.4) to the chassis (1), reducing its temperature. In this embodiment, the group of fins (1.3) is metallic and attached to the chassis (1) by brazing.

According to another embodiment, instead of being in direct contact with one or more electronic components to be cooled of the electronic board (5), the group of cooling fins (1.3) contacts the electronic board (5).

In this embodiment, the end of the group of cooling fins (1.3) has a surface (1.3.1) for contact with the IGBT transistors (5.4) in the form of a plate to facilitate thermal communication between the IGBT transistors (5.4) and the group of cooling fins (1.3).

The group of cooling fins (1.3) is formed by one or more bands of conductive material bent in the form of a bellows, such that the ridges of one side are in thermal contact with the electronic board (5), and the ridges of the opposite side are in thermal contact with the chassis (1).

The chassis (1) according to this embodiment is housed in a shell (4) formed in turn by a lower cover (4.2) or first cover and an upper cover (4.3) or second cover. The shell (4) comprises a support plate (4.1) configured in this embodiment by means of an independent part which serves to fix the chassis (1) together with its heating plates (2, 3) on one hand, and the electronic board (5) on the other hand. The support plate (4.1) furthermore has a perforation or window in its central part such that the group of cooling fins (1.3) can go through the support plate (4.1).

Figure 3:
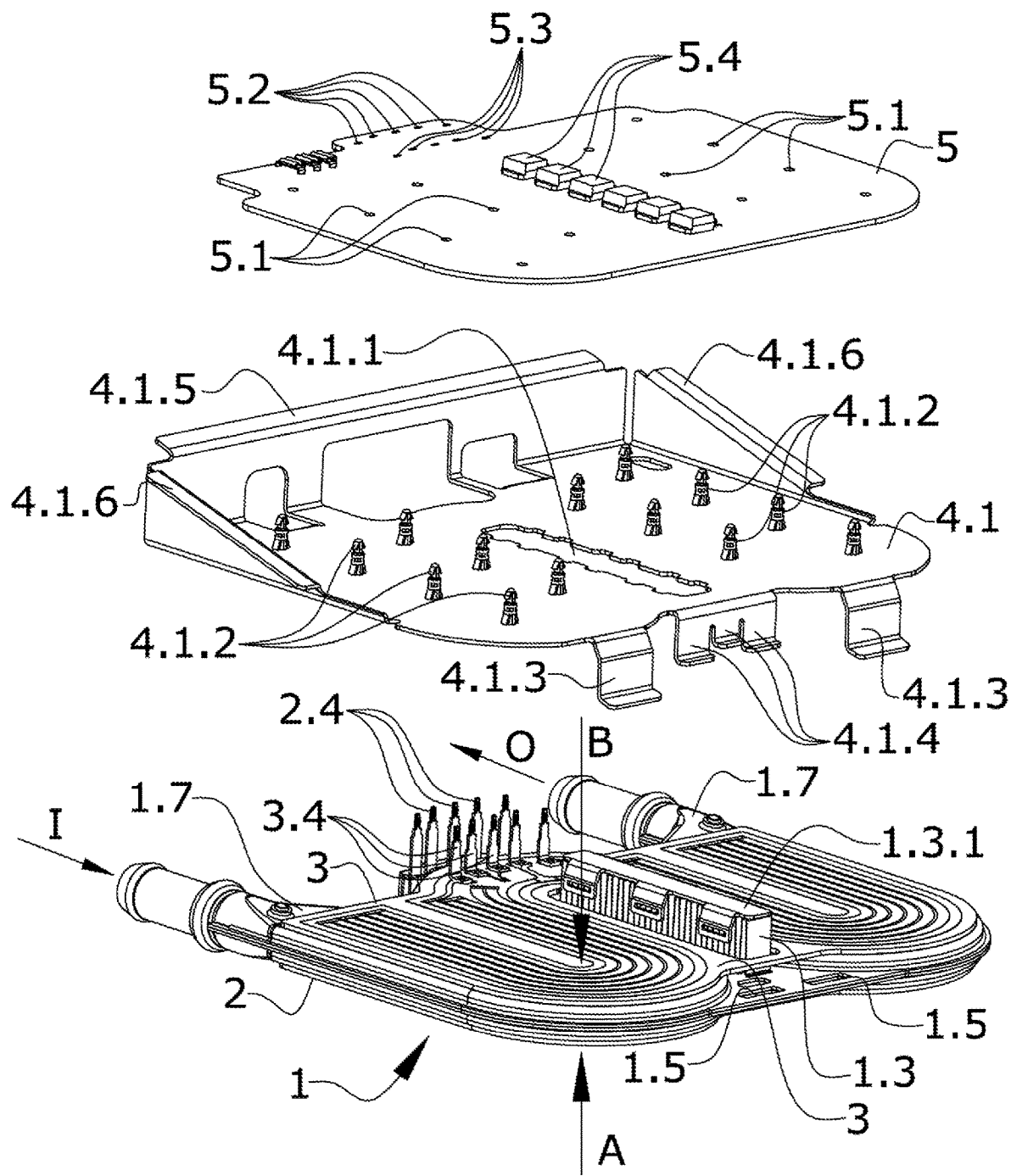
FIG. 3 shows an exploded perspective view of the chassis of the same embodiment with the heating plates, a support plate, and above all these components, the electronic board controlling the power supply of the heating plates.

As shown in the exploded view of FIG. 3, the chassis (1) is located in the lower part, the support plate (4.1) is located thereabove, and the electronic board (5) is located on the support plate (4.1). The support plate (4.1) has first supporting pins (4.1.3) which are located laterally with respect to the chassis (1) and extend perpendicular to the main plane (P) until reaching the lower cover (4.2) where they rest. The support plate (4.1) also has second shorter supporting pins (4.1.4) that rest on the chassis (1), being housed in perforations (1.5) that allow the passage and attachment thereof, such that a fixing is established between the support plate (4.1) and the chassis (1). There are three such second supporting pins (4.1.4), two of which go through the perforations (1.5) of the chassis (1) and one of which does not. The end of the three supporting pins (4.1.4) is bent such that two of them rest on one side of the chassis (1) and the third one, which does not go through any perforation (1.5), rests on the opposite side to secure the fixing.

On the front side of the support plate (4.1), the first supporting pins (4.1.3) establish the fixing on the lower cover (4.2) of the shell (4), and on the rear side of the support plate (4.1) there is a rear supporting strip (4.1.5) which, together with two side supporting strips (4.1.6), establish the support of the four sides the support plate (4.1) shows on the lower cover (4.2) of the shell (4).

The attachment between the support plate (4.1) and the electronic board (5) is an attachment that establishes mutual separation. The attachment is carried out by means of a plurality of insertion anchors (4.1.2) configured in the form of rods protruding perpendicular to the support plate (4.1) and introduced by clipping into fixing perforations (5.1) located in the electronic board (5) in correspondence with the position of the anchors (4.1.2).

The support plate (4.1) shows a central passage window (4.1.1) allowing the passage of the group of cooling fins (1.3) therethrough to enable transferring the heat from the IGBT transistors (5.4) located on one side of the support plate (4.1) to the chassis (1) located on the other side of the support plate (4.1).

As a result of the structure described in this embodiment, the shell (4) is configured for containing in a stacked arrangement:
- the electronic board (5) configured for the electrical/electronic control of the heating plate or plates (2, 3),
- the support plate (4.1) of the electronic board (5) located interposed between the assembly formed by the chassis (1) and the electronic board (5) for holding the electronic board (5) and for separating the chassis (1) and the electronic board (5), and
- the assembly of the chassis (1) and the heating plates (2, 3) for heating the fluid.

Figure 5:
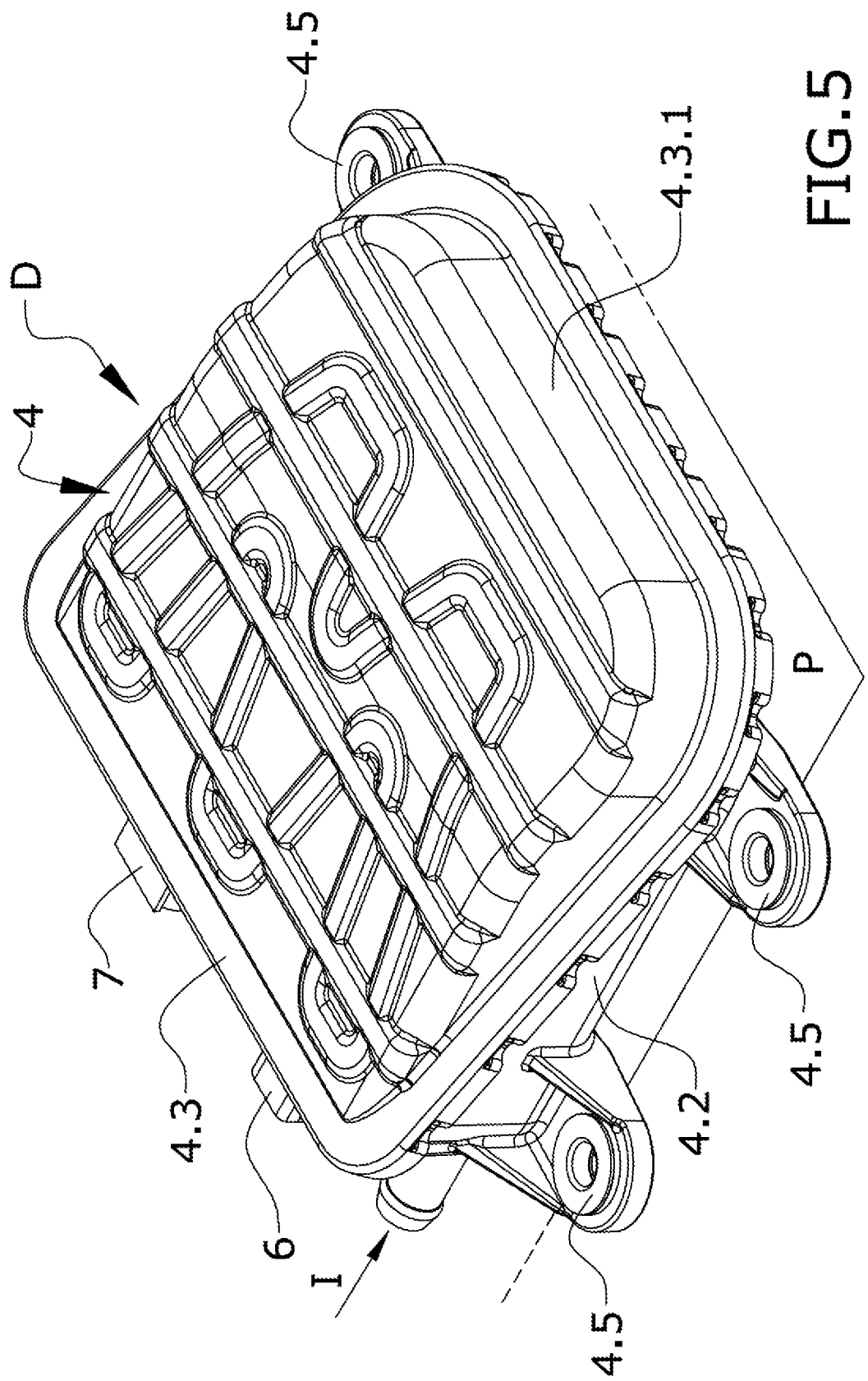
FIG. 5 shows a perspective view of the shell of the device according to an embodiment.

As shown in FIG. 5, the shell (4) is formed by a lower cover (4.2) and an upper cover (4.3) which are attached to form a leak-tight closure according to an oblique plane with respect to the reference plane (P).

Figure 6:
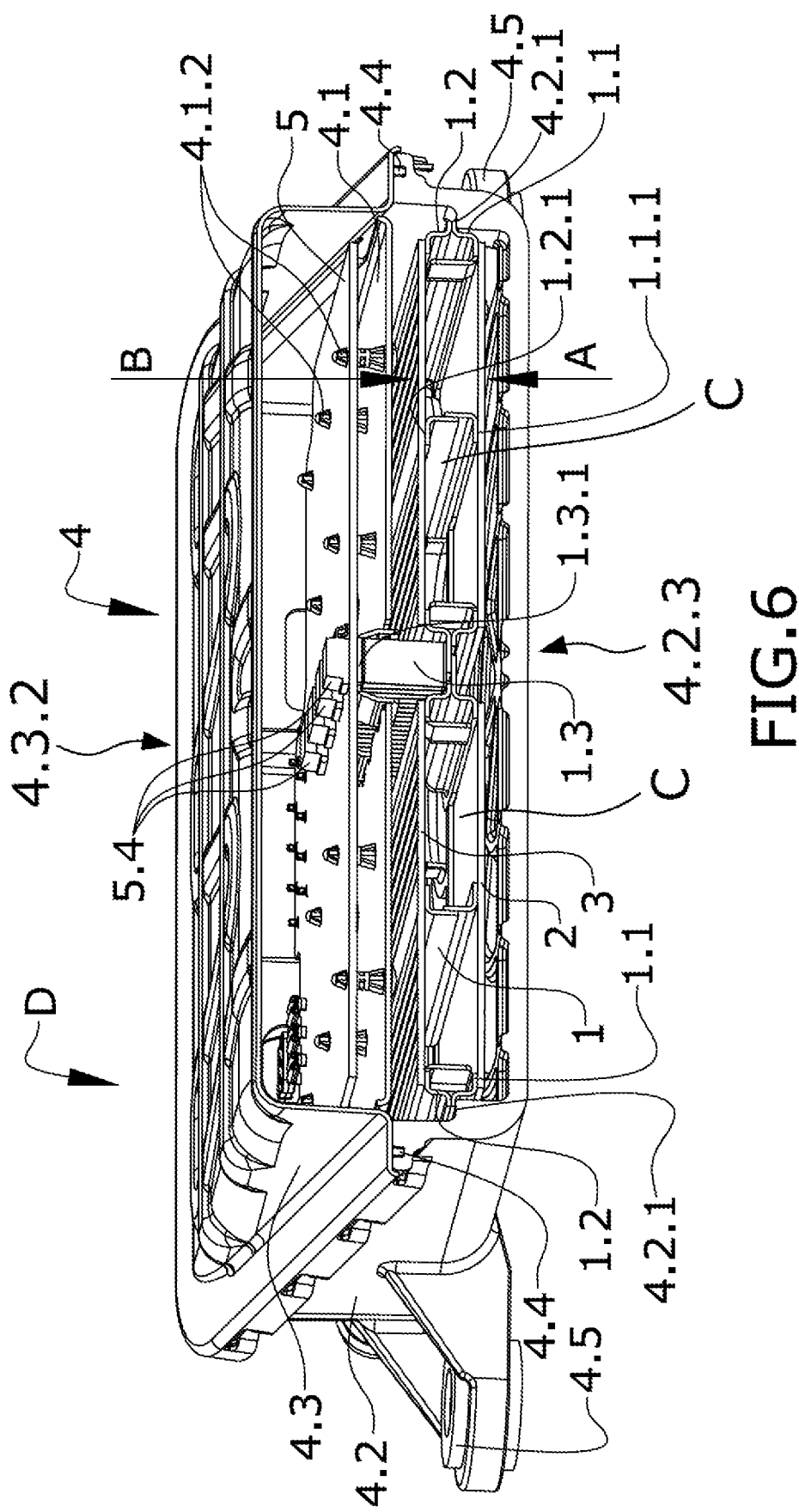
FIG. 6 shows a perspective view of a section transverse to the main plane containing the heater with a planar configuration. The transverse plane allows viewing the inside of the shell where at least the chassis, the heating plates, a support plate, and the electronic board, or printed circuit board PCB as it is called in the field of electronics, are located.

FIG. 6 shows the assembly sectioned according to a plane perpendicular to the main plane (P) with the front part of the device (D) eliminated in order to view the inside thereof. In this section, the attachment of the lower cover (4.2) with the upper cover (4.3) by means of a sealing gasket (4.4) which is shown in an oblique position is seen. This sealing gasket (4.3) is not in the chassis (1), so it is not subjected to the temperatures of the chassis (1).

The same view allows seeing, in a sectional view, the inner chamber (C) and its channels (CH) formed inside the chassis (1), the block of cooling fins (1.3) putting the IGBT transistors (5.4) in thermal communication with the chassis (1) going through the support plate (4.1), and the attachment between the support plate (4.1) and the electronic board (5).

This figure shows the support of the chassis (1) through a perimetral flange configuring the attachment between the two half-chassis (1.1, 1.2) in a perimetral step (4.2.1) of the lower cover (4.2).

Figure 7:
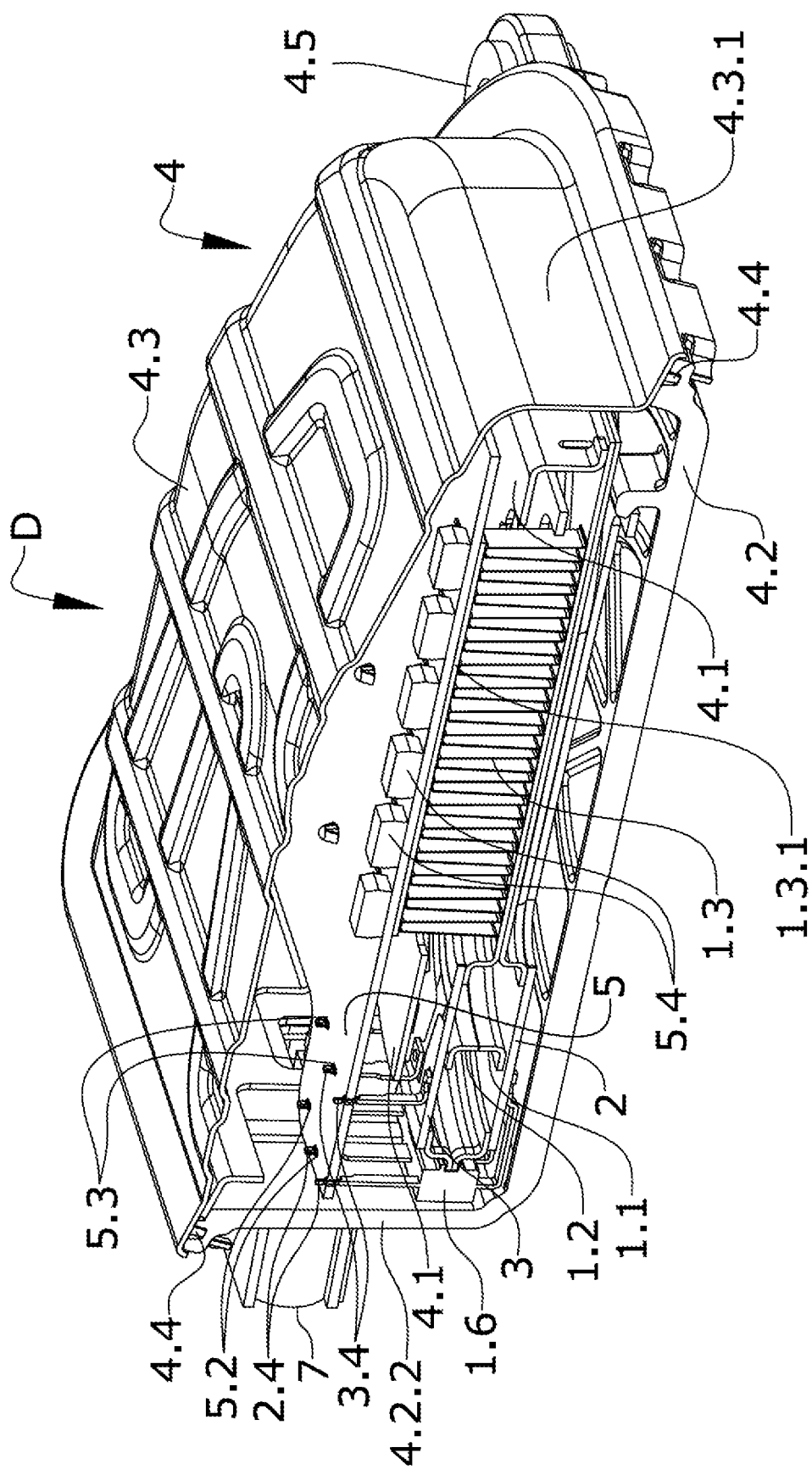
FIG. 7 shows a perspective view of another section transverse to the main plane, the section being rotated 90° with respect to the section shown in the preceding figure, for viewing other internal structures and components of the chassis.

FIG. 7 also shows a section of the device (D) in which, instead of the front part, one side of the device (D) is now removed by means of the plane of section. According to this midplane section, in this view it is possible to see the connectors (2.4) of the lower heating plate (2) which are prolonged in the lower portion according to a direction parallel to the chassis (1), and raised upright after a 90° bend until reaching the electronic board (5). In the vertical segment, the connectors (2.4) go through a reinforcing block (1.6) fixed to the chassis (1) which stiffens the connectors (2.4).

During assembly, the electronic board (5) is vertically inserted by introducing the fixing perforations (5.1) on the anchors (4.1.2) by means of insertion, and the assembly of electrical connectors (2.4, 3.4) are introduced at the same time in the contacts (5.2, 5.3) for receiving said connectors (2.4, 3.4).

The attachment of the upper cover (4.3) on the lower cover (4.2) through the oblique plane of attachment allows configuring a first side wall (4.2.2) on the lower cover (4.2) having larger dimensions than if the plane of attachment were parallel to the main plane (P) and established at mid-height. Additionally, as shown in FIGS. 5 and 7, at the front of the device (D) and therefore on the side opposite where the first side wall (4.2.2) having larger dimensions is located, there is no side wall or there is only a small elevation to allow configuring the housing of the sealing gasket (4.4). In a complementary manner, there is no wall or there is only a small rim on the side of the first side wall (4.2.2) of the upper cover (4.3). On the other hand, on the side opposite where this first side wall (4.2.2) is located, the upper cover (4.3) comprises a second side wall (4.3.1) having larger dimensions than the rim of the opposite side.

This configuration allows the assembly of elements inside the shell (4), i.e., the chassis (1) incorporating the heating plates (2, 3), the support plate (4.1), and the electronic board (5), to form a unit that can be readily inserted into the shell (4).

According to this configuration of the shell (4) that has been described, it can generally be established that the shell has a prismatic configuration with a first base (4.2.3) and a second base (4.3.2) connected by means of side walls, where said shell (4) comprises a first cover, the lower cover (4.2), and a second cover, the upper cover (4.3), that are complementary to one another such that:
- the second cover (4.3) comprises the second base (4.3.2) of the shell (4),
- the first cover (4.2) comprises the first base (4.2.3) of the shell (4), and the covers (4.2, 4.3) close the shell (4) such that a first side wall (4.2.2) of the shell (4) is in the first cover (4.2) and a second wall (4.3.1), located in opposition, is in the second cover (4.3), such that the passage of at least the inlet port (I) of the chassis (1) and the outlet port (O) of the chassis (1) is through the first side wall (4.2.2) of the first cover (4.2). In one embodiment, the prismatic configuration of the shell (4) has walls that are different from one another or have an irregular shape.

In this case, it is understood that the first base (4.2.3) and the second base (4.3.2) are bases of the prism which do not necessarily act as supports for the components inside or of the same shell (4).

The shell (4) has four fixing supports (4.5) formed by projections ending in perforated discs which allow the passage of fixing bolts.

The electronic board (5) is powered by means of two power supply connectors, a low-voltage power supply connector (6) for powering the control circuit, and a high-voltage power supply connector (7) providing the required energy to the heating elements (2.1, 3.1) controlled by means of IGBT transistors (5.4). These two power supply connectors (6, 7) are oriented in the same direction as the inlet port (I) and outlet port (O) of the fluid to be heated such that the four elements (I, O, 6, 7) show the same orientation.

The first side wall (4.2.2) has perforations for the passage of the four elements (I, O, 6, 7), the inlet port (I), the outlet port (O), the low-voltage power supply connector (6), and the high-voltage power supply connector (7), so the assembly of elements inside the shell (4) can be inserted with a single insertion movement into the first side wall (4.2.2), followed by a movement parallel to the main plane (P) from the front. This configuration therefore facilitates putting together the entire assembly, offering a single side for all the connections with a surface of the first side wall (4.2.2) where said connections are located clear of any flanges since the attachment between the lower cover (4.2) and the upper cover (4.3) is at a higher position. In one embodiment, the covers (4.2, 4.3) of the shell (4) are attached to one another by crimping.

In this embodiment, the lower cover (4.2) is made of a plastic material and the upper cover (4.3) is made of steel, and both are attached to one another by means of crimping.

The material used in the covers must be a strong, insulating material. In the shown example, both covers are made of plastic and steel. In one embodiment, the covers are manufactured with a metallic material, for example, steel or aluminum. In another embodiment, the covers are manufactured with a plastic material, for example, polypropylene, polystyrene, or polyethylene terephthalate, so that they are more lightweight.

The invention claimed is:

1. A heating device for use in a vehicle and configured for heating a fluid circulating between an inlet port and an outlet port, which device comprises:
    a chassis with a planar configuration, comprising a first face and a second face arranged on the side opposite the first face, defining an inner chamber for the passage of the fluid, wherein
        the inner chamber comprises at least a first window arranged on one of the faces of the chassis;
        the inlet port is in fluid communication with the chamber, and
        the outlet port is in fluid communication with the chamber;
    two heating plates;
    at least one heating region in each heating plate;
    wherein the heating plate is configured for closing the at least one window of the inner chamber in a leak-tight manner, wherein the heating region of the heating plate is oriented towards the inside of the inner chamber for heating fluid intended for circulating through the inner chamber; wherein
    the chassis with a planar configuration comprises at least one segment for changing the direction of the fluid flow to be heated, and wherein in this segment the chassis comprises a central baffle forming at least two parallel channels in the inner chamber.

2. The heating device according to claim 1, wherein the inner chamber additionally comprises a second window, the first window being arranged on one of the faces of the chassis and the second window being arranged on the opposite face of the chassis, and wherein the two heating plates include a first heating plate closing the first window and a second heating plate closing the second window, wherein the heating regions of both heating plates are oriented towards the inside of the inner chamber for heating fluid intended for circulating through the inner chamber.

3. The heating device according to claim 1, characterized in that the inner chamber of the chassis has a configuration according to a W-shaped inner path, such that the inlet port and the outlet port are arranged in one and the same side wall of the chassis, a side wall being a portion of the chassis extending between the first face and the second face, the inlet port and the outlet port being in fluid communication with one another according to said inner path.

4. The heating device according to claim 1, characterized in that the heating region of the heating plate is in thermal communication with a heating element arranged on the face of the heating plate opposite the face where the heating region is located.

5. A heating device for use in a vehicle and configured for heating a fluid circulating between an inlet port and an outlet port, which device comprises:
    a chassis with a planar configuration, comprising a first face and a second face arranged on the side opposite the first face, defining an inner chamber for the passage of the fluid, wherein
        the inner chamber comprises at least a first window arranged on one of the faces of the chassis;
        the inlet port is in fluid communication with the chamber, and
        the outlet port is in fluid communication with the chamber;
    a heating plate;
    at least one heating region in the heating plate;
    wherein the heating plate is configured for closing the at least one window of the inner chamber in a leak-tight manner, wherein the heating region of the heating plate is oriented towards the inside of the inner chamber for heating fluid intended for circulating through the inner chamber,
    wherein the heating plate further comprises a layer of dielectric material and a structural plate that are stacked together, such that:
        the dielectric material is interposed between the structural plate and the heating element, and
        the heating region is located on the surface of the structural plate opposite the surface of the structural plate in contact with the layer of dielectric material.

6. The heating device according to claim 1, wherein the chassis is manufactured with a thermal conductive material.

7. The heating device according to claim 2, wherein the chassis is formed by two half-chassis, a first half-chassis comprising the first window and a second half-chassis comprising the second window.

8. A heating device for use in a vehicle and configured for heating a fluid circulating between an inlet port and an outlet port, which device comprises:
    a chassis with a planar configuration, comprising a first face and a second face arranged on the side opposite the first face, defining an inner chamber for the passage of the fluid, wherein
        the inner chamber comprises at least a first window arranged on one of the faces of the chassis;
        the inlet port is in fluid communication with the chamber, and
        the outlet port is in fluid communication with the chamber;
    two heating plates;
    at least one heating region in each heating plate;
    wherein the heating plate is configured for closing the at least one window of the inner chamber in a leak-tight manner, wherein the heating region of the heating plate is oriented towards the inside of the inner chamber for heating fluid intended for circulating through the inner chamber, wherein the heating device further comprises a shell configured for containing the stacked arrangement of:
    the assembly formed by the chassis and the heating plates,
    an electronic board configured for the electrical/electronic control of the heating plates, and
    a support plate of the electronic board located interposed between the assembly formed by the chassis and the electronic board for holding the electronic board and for separating the chassis and the electronic board.

9. The heating device according to claim 8, wherein the shell has a prismatic configuration with a first base and a second base connected by means of side walls, where said shell comprises a first cover and a second cover that are complementary to one another, such that:

the second cover comprises the second base of the shell, the first cover comprises the first base of the shell, and the covers close the shell such that a first side wall of the shell is in the first cover and a second wall, located in opposition, is in the second cover such that the passage of at least the inlet port of the chassis and the outlet port of the chassis is through the first side wall of the first cover.

10. The heating device according to claim 4, wherein the heating element is powered by means of a high-voltage circuit and controlled by means of a low-voltage circuit acting on switching devices for the controlled switching of the high-voltage circuit.

11. The heating device according to claim 8, wherein the chassis comprises a group of cooling fins for cooling one or more components of the electronic board, wherein the group of cooling fins extend from the chassis to either the electronic board or one or more electronic components to be cooled of the electronic board.

12. The heating device according to claim 8, wherein support plate comprises a plurality of anchors for attaching the support plate to the electronic board, keeping the support part and electronic board spaced from one another.

13. The heating device according to claim 1, wherein the heating plates are attached to the chassis by means of welding.

14. The heating device according to claim 7, wherein half-chassis are attached to one another by means of welding.

* * * * *